US011256111B2

(12) United States Patent
Fongen

(10) Patent No.: US 11,256,111 B2
(45) Date of Patent: Feb. 22, 2022

(54) EYEGLASS LENS PIECE CONFIGURED FOR BOTH FORWARD AND REARWARD VIEWING

(71) Applicant: CFONGEN AS, Klokkarstua (NO)

(72) Inventor: Carsten Fongen, Klokkarstua (NO)

(73) Assignee: CFONGEN AS, Klokkarstua (NO)

(*) Notice: Subject to any disclaimer, the term of this patent is extended or adjusted under 35 U.S.C. 154(b) by 222 days.

(21) Appl. No.: 16/643,388

(22) PCT Filed: Aug. 29, 2018

(86) PCT No.: PCT/EP2018/073198
§ 371 (c)(1),
(2) Date: Feb. 28, 2020

(87) PCT Pub. No.: WO2019/043041
PCT Pub. Date: Mar. 7, 2019

(65) Prior Publication Data
US 2020/0225509 A1 Jul. 16, 2020

(30) Foreign Application Priority Data

Aug. 29, 2017 (NO) .................................. 20171398

(51) Int. Cl.
G02C 7/14 (2006.01)
(52) U.S. Cl.
CPC ...................... G02C 7/14 (2013.01)
(58) Field of Classification Search
CPC ..................... G02C 7/14; G02C 9/00
See application file for complete search history.

(56) References Cited

U.S. PATENT DOCUMENTS

| 5,044,741 A | * | 9/1991 | De Giacomi | G02C 7/14 351/50 |
| 5,048,943 A | * | 9/1991 | Allen | G02C 7/14 351/50 |
| 5,416,536 A | | 5/1995 | Tee, Jr. | |
| 5,537,160 A | | 7/1996 | King | |

(Continued)

FOREIGN PATENT DOCUMENTS

| CN | 2338770 Y | 9/1999 |
| CN | 2375976 Y | 4/2000 |
| DE | 4019911 C2 | 2/1994 |

OTHER PUBLICATIONS

Office Action issued in Chinese Application No. 201880056235.9, dated Feb. 1, 2021 (14 pages).

(Continued)

Primary Examiner — Tuyen Tra
(74) Attorney, Agent, or Firm — Osha Bergman Watanabe & Burton LLP

(57) ABSTRACT

An eyeglass lens piece (10) configured for both forward and rearward viewing by a user comprises at least one curved transparent section extending in front of, above, between and below the user's eyes and a distance laterally from the sides of said user's eyes to the approximate sides of the user's head, a housing (11) arranged at an edge in the lower section (12) of the lens piece (10), projecting from the lens piece, and a mirror (15) arranged in the housing in a position offset from the curved transparent section.

18 Claims, 5 Drawing Sheets

(56) References Cited

U.S. PATENT DOCUMENTS

| | | | | | |
|---|---|---|---|---|---|
| 6,065,832 | A | * | 5/2000 | Fuziak | G02C 7/14 |
| | | | | | 351/50 |
| 6,076,924 | A | * | 6/2000 | Wysocki | G02C 7/14 |
| | | | | | 351/50 |
| 8,156,575 | B2 | * | 4/2012 | Tronvig | A61F 9/029 |
| | | | | | 2/422 |
| 9,720,254 | B1 | * | 8/2017 | Huang | G02C 7/14 |
| 2013/0148220 | A1 | | 6/2013 | Garrels | |
| 2014/0036220 | A1 | * | 2/2014 | Ashiogwu | G02C 7/14 |
| | | | | | 351/50 |
| 2017/0075145 | A1 | | 3/2017 | Armstrong | |

OTHER PUBLICATIONS

International Search Report issued in the counterpart European Patent Application No. PCT/EP2018/073198, dated Oct. 17, 2018 (4 pages).
Norwegian Search Report issued in the counterpart Patent Application No. 20171398, dated Mar. 16, 2018 (2 pages).
Written Opinion issued in the counterpart European Patent Application No. PCT/EP2018/073198, dated Oct. 17, 2018 (6 pages).

* cited by examiner

EYEGLASS LENS PIECE CONFIGURED FOR BOTH FORWARD AND REARWARD VIEWING

In bicycling and many other sports, in particular high-speed sports, the athletes experience the problem of 'seeing behind'. A long-standing need, recognized especially in bicycle riding, is for the rider to see traffic approaching from the rear without having to bodily swivel around to do so. Looking back in this manner can be very dangerous as it frequently causes the rider to swerve or wander into the path of an approaching vehicle. The reason for this is excessive head movement and the simple fact that the rider naturally tends to steer and lean in the direction he is looking. Therefore, to maintain good balance while 'seeing behind' it is necessary for the rider to keep his head steady. Typically, there is no minimum safe distance stipulated for a motor vehicle when passing a bicycle in traffic. The bicycle rider cannot totally rely on audible clues to traffic coming from behind. He must at times change lanes and make turns, and such maneuvers require good spatial orientation and reliable information. Wrong assumptions or uncertainty regarding traffic conditions can, and all too frequently do have, dire consequences.

Due to this problem, there has been made attempts to solve the bicyclist's problem of 'seeing behind' by developing mirror devices for rear viewing. These fall broadly into several types: handlebar mounted mirrors, helmet mounted mirrors and eyeglass mounted mirrors. Handlebar mounted mirrors receive a great deal of road shock directly through the front fork and bicycle frame. Therefore, they are very prone to vibration which can result in blurred vision and frequent readjustments. The helmet mounted type has likewise met with minimal acceptance due to a lack of aesthetics, poor aerodynamics and a perceived safety hazard which could result from a head first crash while having an object protruding forward in front of the rider's face. Eyeglass mounted mirrors have many of the same drawbacks including poor aerodynamics and the sacrificing of some forward visibility. The nuisance of having a permanent fixture suspended in front of the user's face requires an unwelcome accommodation generally rejected by most riders.

U.S. Pat. No. 5,416,536 An aerodynamic eyeglass lens piece which integrally combines a central inboard transparent section with laterally outboard mirror sections, thus enabling a forward-facing user to see objects in front as well as behind.

US2017075145 relates to removable rear viewing mirror attached to the exterior surface of the lens of eyewear for sports, motorcycle helmet shields, and especially the lens of eyewear for cycling. The mirror is used to supplement the wearer's view of the area behind and to the side, and can be adjusted by rotation.

The problem with these and other prior art mirror devices, is that they either obscure a substantial part of the wearer's field of view, that they do not provide sufficient or the needed view, and/or that they are inconvenient in use.

The object of the invention is to provide an eyeglass lens piece and eye glass configured for both forward and rearward viewing, which solves the above-mentioned problems.

The object of the invention is achieved by means of the features of the patent claims.

In one embodiment, an eyeglass lens piece configured for both forward and rearward viewing comprises at least one curved transparent section extending in front of, above, between and below the user's eyes and a space distance laterally from the sides of said user's eyes to the approximate sides of the user's head.

The curved transparent section may be substantially spheroidally curved or have any other suitable shape. In most sports eyeglasses, the lens piece aims to substantially follow the contour of the face of the user to minimize drag and maximize sun and wind shading. The invention is particularly useful in these types of eyeglasses, in order to bring the rear viewing mirror at a correct distance from the eye to be able to focus. The lens piece often comprises only one continuous curved transparent section, but there are several applications where the lens piece comprises two separate curved transparent sections arranged side by side, to be arranged substantially in front of each of the user's eyes when in use.

A housing is arranged in an edge section of the lens piece, projecting from the lens piece. The housing may be arranged in flush with the outer edge of the lens piece, or may be arranged with a distance to the edge, ie. the housing being surrounded by part of the lens piece. In one embodiment, the housing is arranged in the lower section of the lens piece, but it can be arranged at any convenient height, for example depending on the size of the curved transparent section or the desired view. In case of a large curved transparent section, the housing may be arranged further up than at a smaller curved transparent section in order to provide the best line of sight and to prevent that the user needs to move his/her head substantially to get the best rearward field of view.

The housing may be made of any suitable material. In one embodiment the housing is shaped as a triangular prism, but it may also have other polyhedron shapes. In another embodiment, the housing is shaped substantially shaped as an open cube, with four side walls and an end wall connected to all side walls. The housing may have other shapes, such as for example being cylindrical, or oval. In most embodiments, the housing will have an end wall which is substantially parallel to the surface of the curved transparent section in its front section, i.e. the section which is adapted to cover the area between the eyes of the user.

The housing projects outwards, i.e. projects out from the convex side of the curved transparent section, providing a perpendicular distance between the curved transparent section and the farthest part of the projected housing. This places the end wall at a distance further from the user's face then the curved transparent section when used by a user. One side of the housing is open, to give the user direct sight line to the inside. The curved transparent section and the housing may be one integrated unit. For example, the section of the lens piece where the housing is arranged is cut away or absent, and substituted by the housing, ie. the housing is arranged as a part of the lens piece. The housing and the curved transparent section may also be produced together as one unit. The integrated design ensures minimal obstruction of the view, a more robust construction, and also avoids image distortion caused by the light passing through several layers.

In the housing, a mirror is arranged. The mirror is in one embodiment arranged in the housing with an angle relative to the curvature or the projected curvature of the curved transparent section. This may be achieved by the shape of the housing, by a fixed mounting of the mirror in the housing or by using an angular adjustment mechanism which connects the mirror movable to the housing. This brings the mirror into a position where the light from behind the wearer is reflected by the mirror surface and towards the eye of the wearer. The angle of the mirror may be different for different curvatures of the curved transparent section in order to provide optimal rearward view.

The angular adjustment mechanism may connect the mirror adjustable to the housing in such a way that the angle of the mirror relative to the lens piece may be adjusted to achieve the desired rearward view. In one embodiment, the angular adjustment mechanism is connected to the end wall of the housing.

The curved transparent section (or sections) is substantially symmetrical and has a symmetry axis. In one embodiment, the mirror is arranged in the housing to be substantially perpendicular to the symmetry axis, which means that the mirror will be substantially perpendicular to the direction of movement of the user wearing eyeglasses with this eyeglass lens piece.

The main purpose of the housing is to offset the mirror with respect to the curved transparent section, and thus provide sufficient distance from the wearer's eye, in order to provide a depth of field required for a rearview. In one embodiment the mirror is offset 0-1 cm with respect to the surface of the lens piece, allowing a depth of field required for a rearview, i.e. the housing extends 0-1 cm out from the surface of the curved transparent section, or the projection distance of the housing combined with the size of the angular adjustment mechanism or other connection device offsets the mirror 0-1 cm with respect to the outer surface of the lens piece.

There may be only one housing or there may be arranged a housing in both of the side edge sections of the laterally extended section of the curved transparent section.

The angular adjustment mechanism may be provided to make the lens piece adaptable for each user, as the user will be able to adjust the mirror to an angle where he/she has more optimal backwards view. As the size and shape of the users' head can vary, this adjustment may be useful to provide a lens piece for general use.

The angular adjustment mechanism may comprise a ball and socket adapted to provide angular adjustment of the mirror through the rotational function of the ball and socket design. In such a mechanism, angular adjustment is allowed in three dimensions, i.e. roll, pitch up or pitch down between 0 and 45 degrees about a paralleled vertical axis to the lens piece and, yaw by 0 and 45 degrees about a left or right horizontal axis to the lens piece. Other kinds of adjustment mechanisms may also be used.

The lens piece will normally be used with a supporting means on the head and centered a predetermined space distance in front of the user's eyes to form complete eye glasses.

The invention will now be described in more detail by means of an example and by reference to the accompanying figures.

Figure 1:
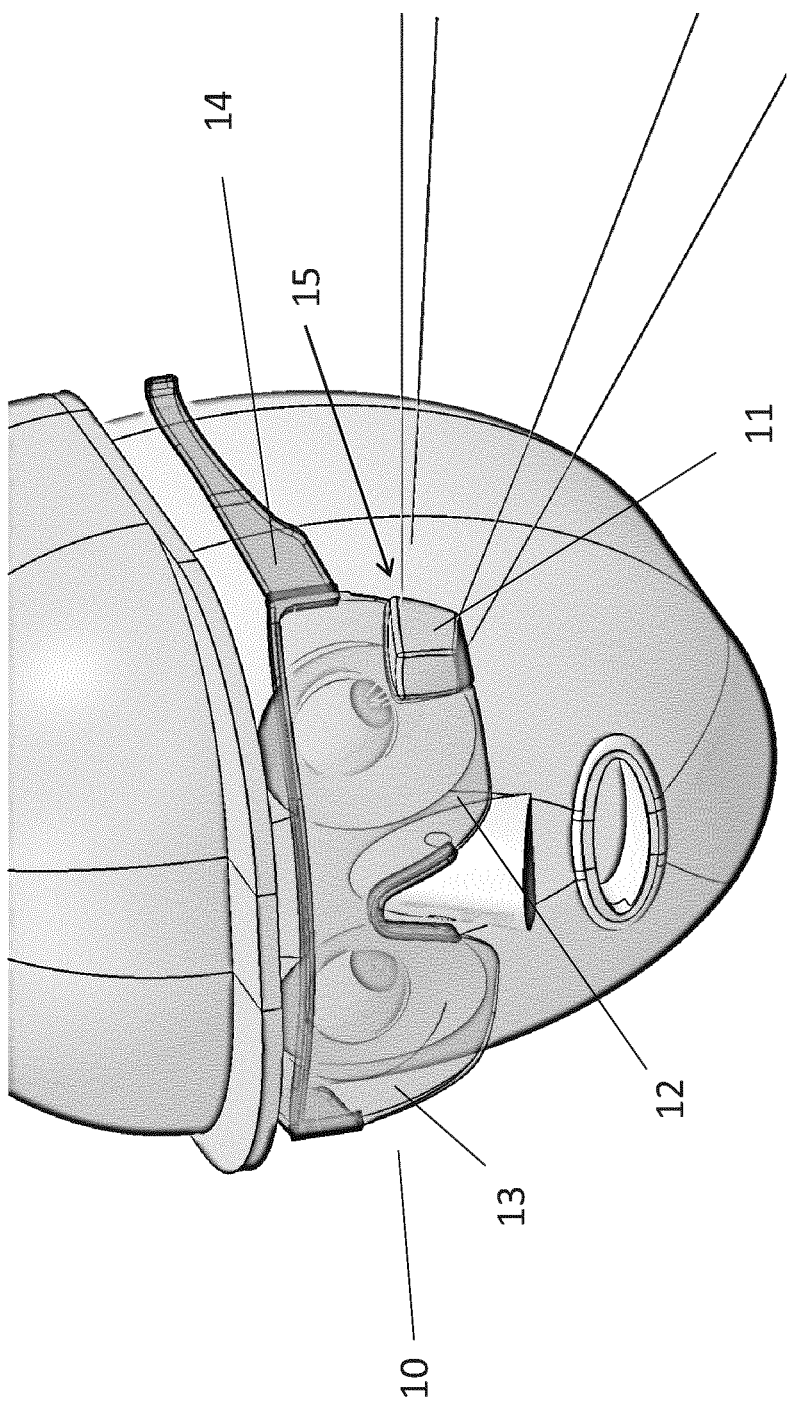
FIG. 1 illustrates eyeglasses with an embodiment of an eyeglass lens piece according to the invention wore by a user.

FIG. 1 illustrates an eyeglass lens piece 10 configured for both forward and rearward viewing by a user. The lens piece 10 is part of a pair of eyeglasses and is connected to supporting means 14 for placing on the head of the user. The supporting means 14 is adapted to have the lens piece 10 centered a predetermined distance in front of the user's eyes. The lens piece 10 comprises at least one curved transparent section 13 extending in front of, above, between and below the user's eyes and a space distance laterally from the sides of said user's eyes to the approximate sides of the user's head, such that the field of view of the user is substantially covered by the transparent section. The lens piece 10 further comprises a housing 11 arranged in an edge section in the lower section 12 of the lens piece 10, the housing 11 projecting outwards from the lens piece, ie. projecting away from the user's face. In this example the housing is places at the lower, farthest edge of the lens piece, but in other embodiments, the housing may be placed other places in the lens piece, with at least some distance to either the lower edge, the side edge, or both.

The housing 11 has a mirror 15 arranged inside and with its reflecting surface facing the user, for rearward viewing.

Figure 2:
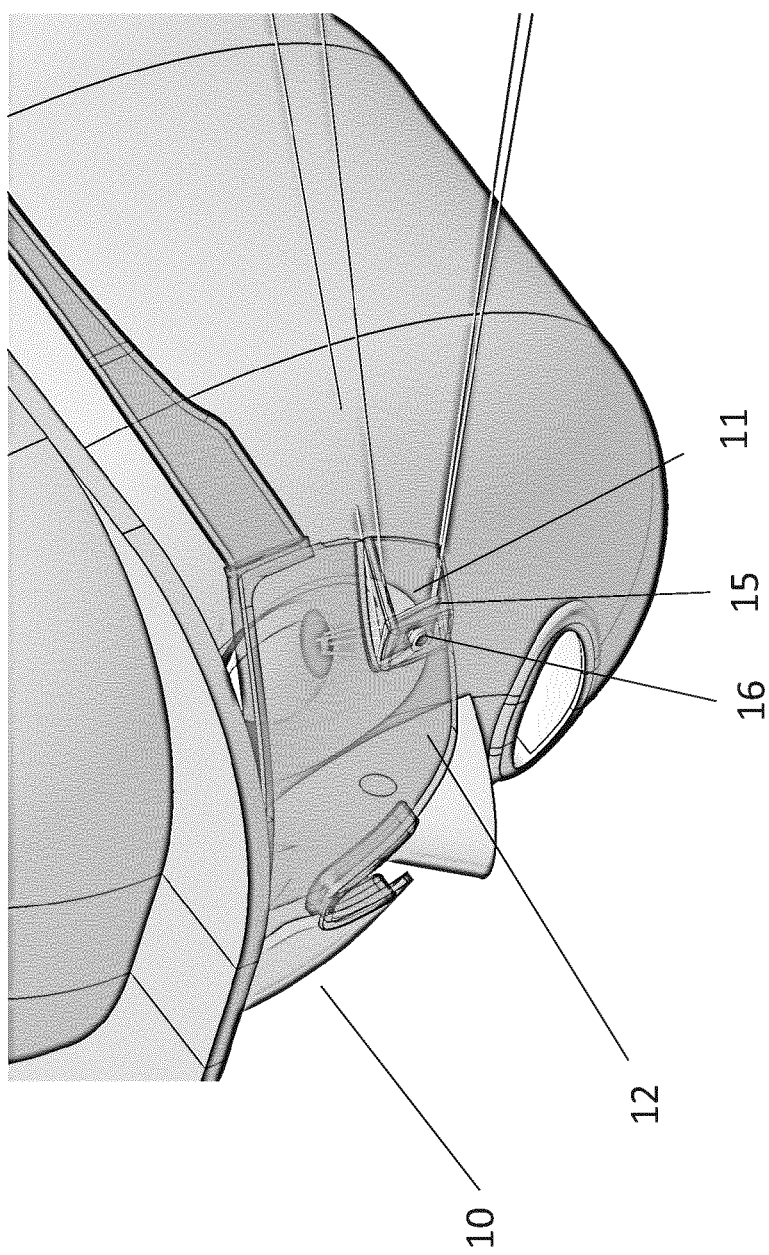
FIG. 2 shows the same embodiment as in FIG. 1, seen from a different angle.
Figure 4:
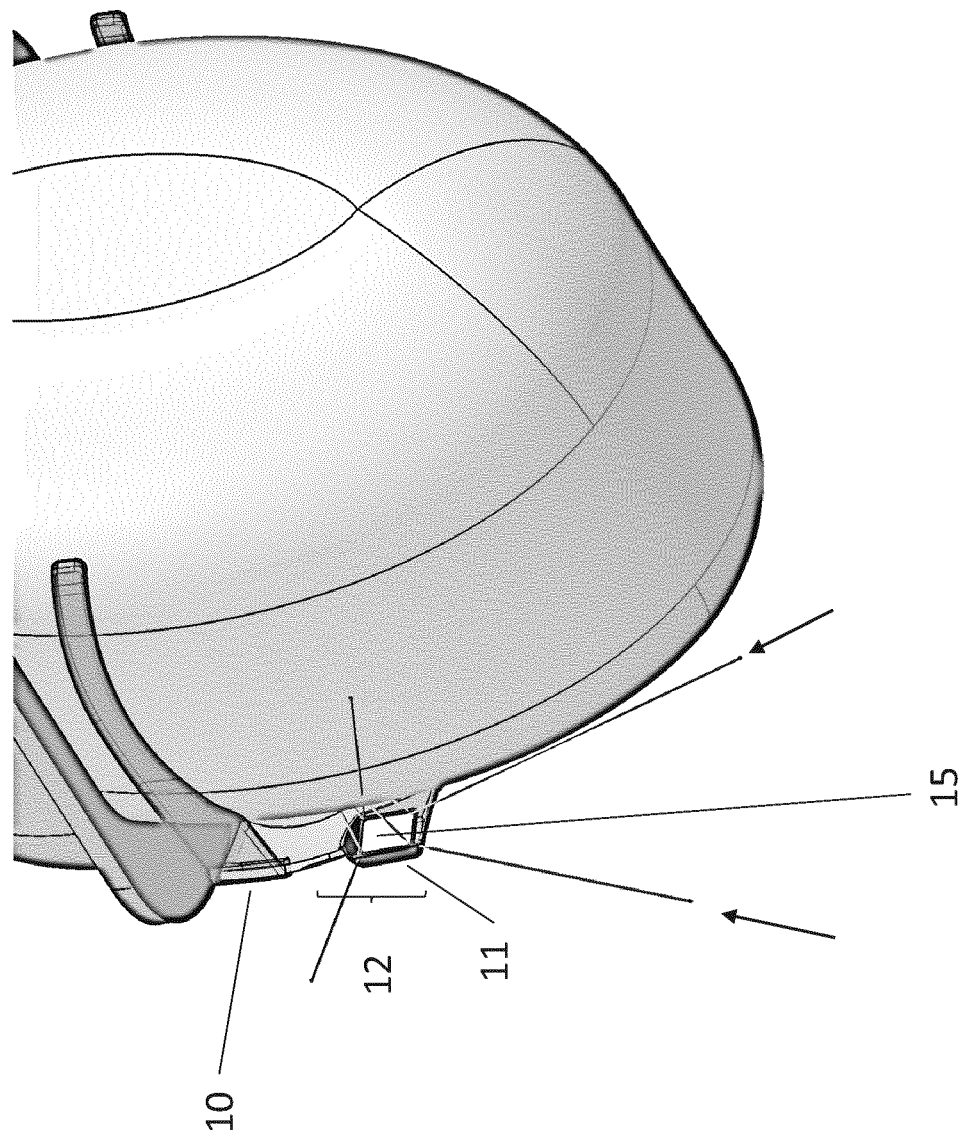
FIG. 4 shows the eyeglasses worn by a user viewed from behind.

FIGS. 2 and 4 more clearly illustrates how the light is reflected by the mirror 15 to give the user a view of what is going on behind him/her. As seen for example in FIG. 4, the mirror 15 reflects the incident light passing by the side of the user's head towards the eye. As can be seen from the figures, the housing 11 is not placed on the surface of the lens piece 10/curved transparent section 13, but rather forms a part of the lens piece as it replaces a section of the lens piece, thus eliminating that the light passes through several layers.

Figure 3:
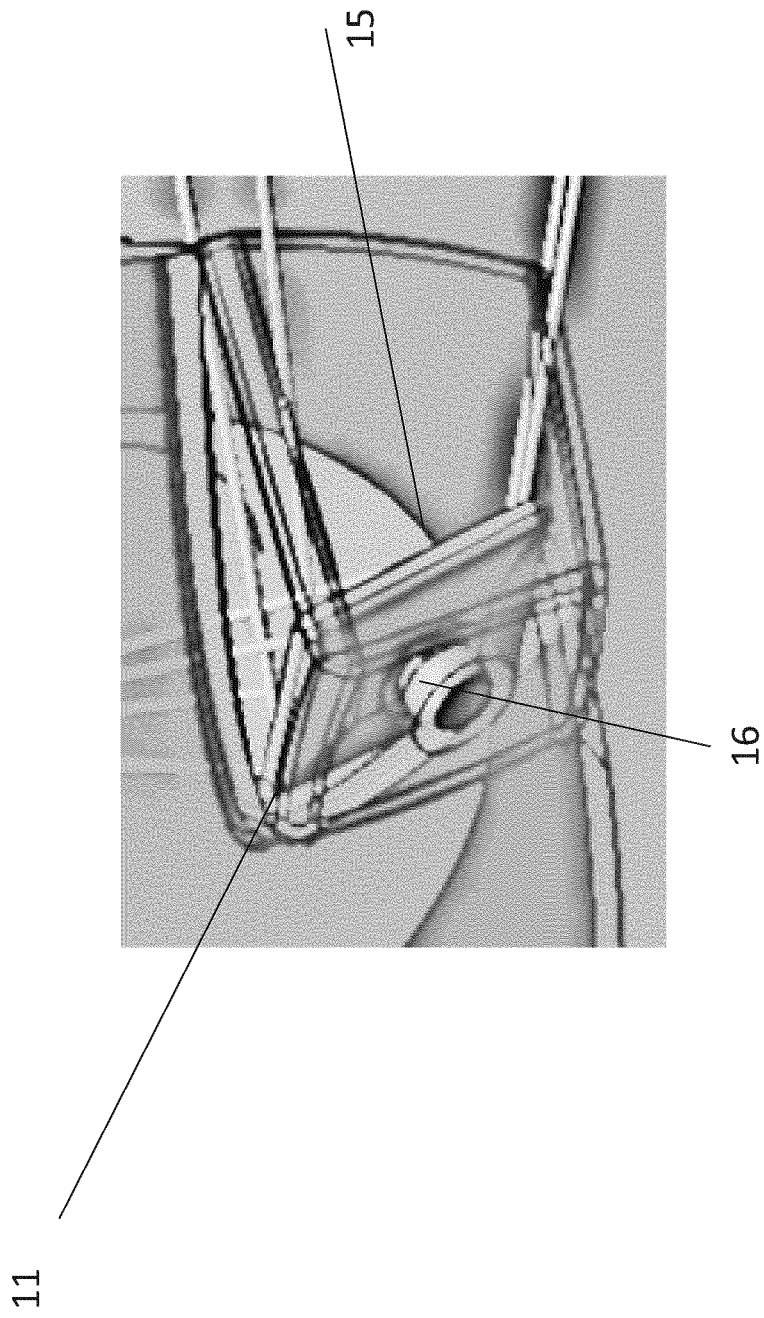
FIG. 3 illustrates a detail of the embodiment of FIGS. 1 and 2.

FIG. 3 shows more detailed how the mirror 15 is tilted relative to the housing 11. The mirror is in this embodiment attached to the angular adjustment mechanism 16, which in turn is connected to the housing 11. The angular adjustment mechanism connects the mirror 15 adjustable to the housing 11. The adjustable connection ensures that the mirror may be adjusted by the user to provide the correct angle for the view behind the user to be reflected into the user's field of view. The angular adjustment mechanism is movable in all direction, thus allowing the tilt angle of the mirror to be changed. The tilt can be changed by simply touching the mirror and moving the face of the mirror into the desired position where the user has a rearward view. In other embodiments, the mirror is placed in a fixed position and thus a fixed angle. As can be seen particularly from FIGS. 2 and 4, the curved transparent section and the housing is made as one integrated unit.

Figure 5:
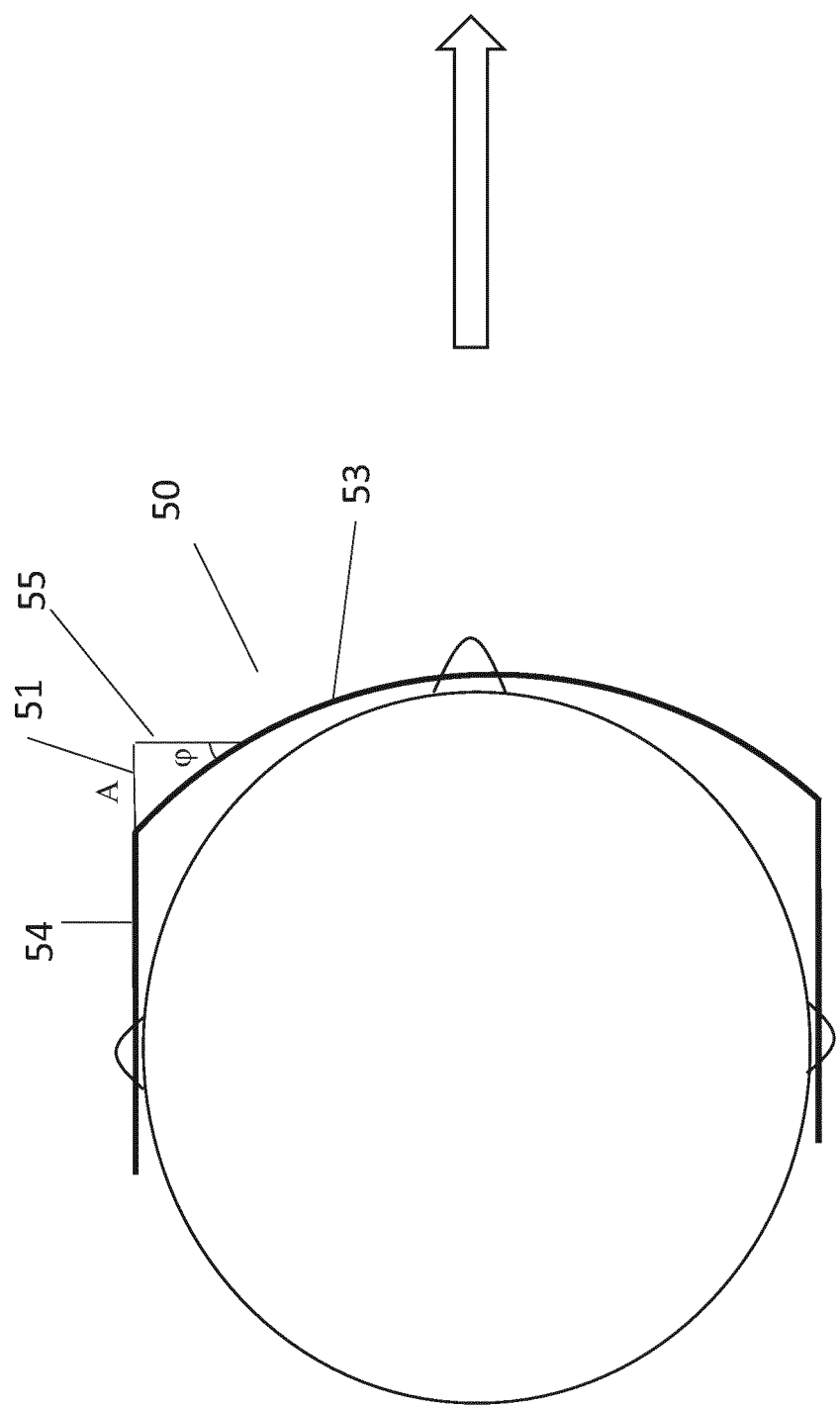
FIG. 5 shows schematically an eyeglass with a lens piece according to the invention seen from directly above.

FIG. 5 illustrates schematically the eyeglass lens piece 50 seen from directly above. The housing 51 is arranged at the left edge of the curved transparent section 53. The housing is in this embodiment shaped as a triangular prism, with one corner edge being flush with the transparent section 53 and the other having a distance A from the edge of the transparent section. The mirror, which is arranged at the inside of the outer wall of the housing, thus forms an angle φ relative to the curvature of the curved transparent section 53. The angle φ in this illustration, as in many embodiments of the invention, is substantial perpendicular with respect to the travelling direction of the user, here illustrated by the arrow.

The invention claimed is:

1. An eyeglass lens piece configured for both forward and rearward viewing by a user, comprising:
   at least one curved transparent section extending in front of, above, between and below the user's eyes and a distance laterally from the sides of said user's eyes to the approximate sides of the user's head,
   a housing arranged in an edge section of the lens piece, projecting from the lens piece, and
   a mirror arranged in the housing in a position offset from the curved transparent section.

2. An eyeglass lens piece according to claim 1, where the housing projects a distance allowing the mirror to be offset 0-1 cm with respect to the surface of the lens piece, allowing a depth of field required for a rearview.

3. Eyeglasses comprising a lens piece according to claim 2, said eyeglass lens piece adapted by a supporting means on the head and centered a predetermined space distance in front of the user's eyes.

4. Eyeglass lens piece according to claim 1, where there are one or two housings, arranged at one or both side edges of the laterally extended section of the curved transparent section.

5. Eyeglasses comprising a lens piece according to claim 4, said eyeglass lens piece adapted by a supporting means on the head and centered a predetermined space distance in front of the user's eyes.

6. Eyeglass lens piece according to claim 1, where the curved transparent section is substantially spheroidal curved.

7. Eyeglasses comprising a lens piece according to claim 6, said eyeglass lens piece adapted by a supporting means on the head and centered a predetermined space distance in front of the user's eyes.

8. Eyeglass lens piece according to claim 1, where the curved transparent section and the housing is one integrated unit.

9. Eyeglasses comprising a lens piece according to claim 8, said eyeglass lens piece adapted by a supporting means on the head and centered a predetermined space distance in front of the user's eyes.

10. Eyeglass lens piece according to claim 1, where the mirror is arranged in the housing with an angle relative to the curvature of the curved transparent section.

11. Eyeglass lens piece according to claim 10, where the curved transparent section has a symmetry axis and the mirror is arranged in the housing to be substantially perpendicular to the symmetry axis.

12. Eyeglasses comprising a lens piece according to claim 11, said eyeglass lens piece adapted by a supporting means on the head and centered a predetermined space distance in front of the user's eyes.

13. Eyeglasses comprising a lens piece according to claim 10, said eyeglass lens piece adapted by a supporting means on the head and centered a predetermined space distance in front of the user's eyes.

14. Eyeglass lens piece according to claim 1 comprising an angular adjustment mechanism arranged in the housing and connecting the mirror adjustable to the housing.

15. An eyeglass lens piece according to claim 14, where the housing projects a distance, which combined with the angular adjustment mechanism, offsets the mirror 1-2 cm with respect to the outer surface of the lens piece, allowing a depth of field required for a rearview.

16. Eyeglasses comprising a lens piece according to claim 15, said eyeglass lens piece adapted by a supporting means on the head and centered a predetermined space distance in front of the user's eyes.

17. Eyeglasses comprising a lens piece according to claim 14, said eyeglass lens piece adapted by a supporting means on the head and centered a predetermined space distance in front of the user's eyes.

18. Eyeglasses comprising a lens piece according to claim 1, said eyeglass lens piece adapted by a supporting means on the head and centered a predetermined space distance in front of the user's eyes.

\* \* \* \* \*